United States Patent
Reeder

(10) Patent No.: US 6,268,962 B1
(45) Date of Patent: Jul. 31, 2001

(54) REEDER ROTATOR

(75) Inventor: Robin A. Reeder, El Segundo, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/483,254

(22) Filed: Jan. 13, 2000

(51) Int. Cl.$^7$ .................................................... G02B 5/30
(52) U.S. Cl. ............................................. 359/497; 359/494
(58) Field of Search ..................... 359/494, 495, 359/497, 498

(56) References Cited

U.S. PATENT DOCUMENTS 4,678,287 * 7/1987 Buhrer ............................ 359/498
4,772,104 * 9/1988 Buhrer ............................ 359/498

OTHER PUBLICATIONS

Hect, "Optics", pp. 305–306, 1987.*

* cited by examiner

*Primary Examiner*—Darren Schuberg
(74) *Attorney, Agent, or Firm*—Colin M. Raufer; Leonard A. Alkov; Glenn H. Lenzen, Jr.

(57) ABSTRACT

An optical rotator includes a pair of waveplates which receive a polarized beam having a first state and outputs a polarized beam having a second state rotated 90° with respect to the first state. In the illustrative embodiment, the first and second waveplates are physically coupled to one another.

11 Claims, 2 Drawing Sheets

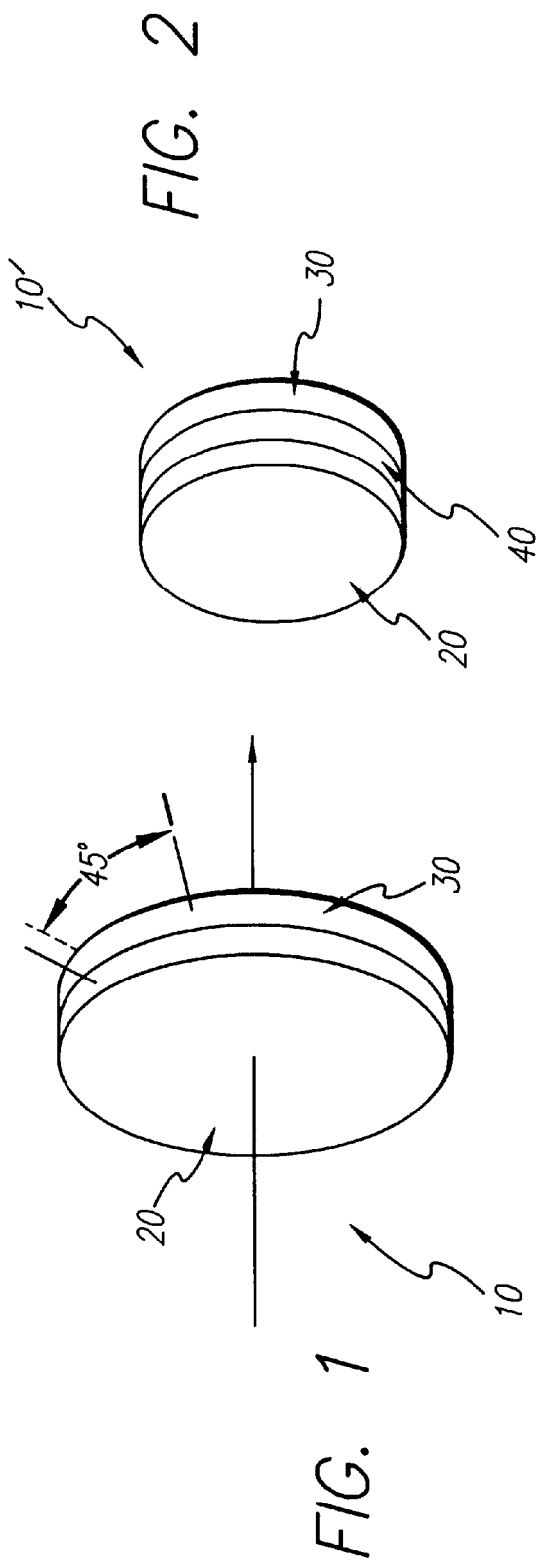
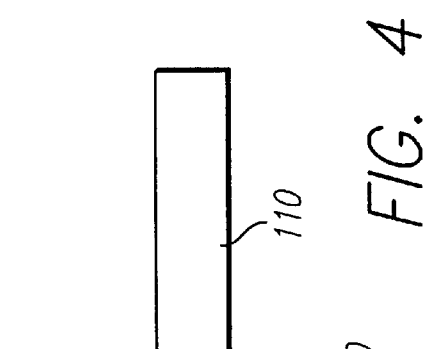

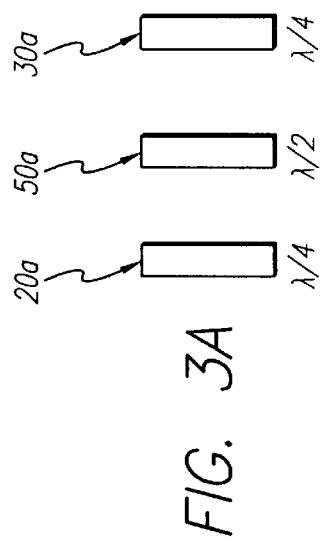
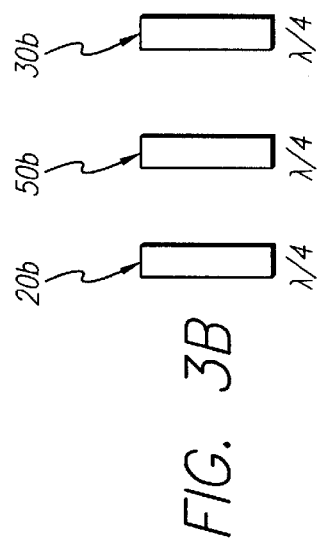
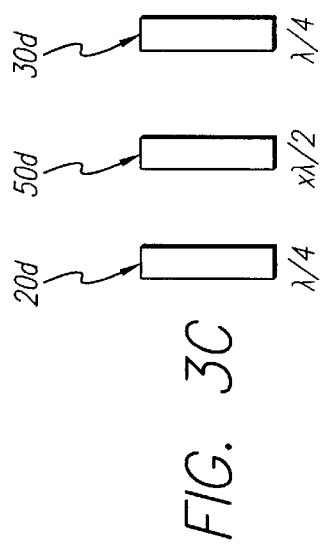
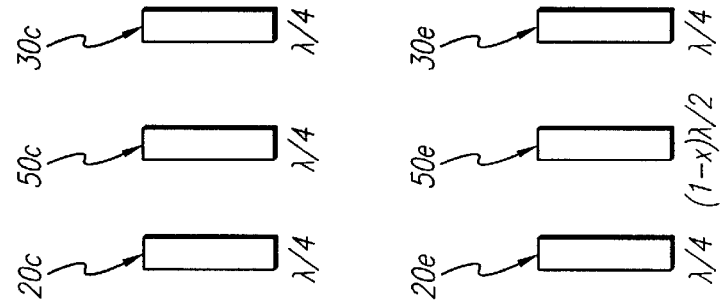
FIG. 3A   FIG. 3B   FIG. 3C

REEDER ROTATOR

BACKGROUND OF THE INVENTION

1. Field of the Invention

The present invention relates to optical devices. More specifically, the present invention relates to optical rotators.

2. Description of the Related Art

For optical systems, there is often a need to rotate the polarization state of an optical beam. For this purpose, optical rotators are made of quartz are often used. A half waveplate made of birefringent material can also be employed to transform a given linear polarization state into a different linear polarization state. A specific orientation of the half waveplate is necessary to achieve this result, while the optical rotator can have any orientation. These devices are generally passive and reciprocal. Electro-optical crystals are active waveplates, where phase is proportional to applied voltage. Non-reciprocal applications require Faraday rotators.

An optically active rotator rotates the plane of polarization of light passing through it. A typical optically active rotator is generally a fairly long device, requiring a large block of optical grade material such as quartz. One of the advantages of an optically active medium used in fabricating a rotator is that the rotator can be fabricated that rotates the transmitted beam by any desired angle, not just 90°. One of the disadvantages to employing an optically active medium is that high quality material is not available at all wavelengths.

Other inventions by this Applicant also assigned to Raytheon Company include:

"Reeder Rod" Ser. No. 09/482,230, filed Jan. 13, 2000; "Reeder Compensator" Ser. No. 09/482,376, filed Jan. 13, 2000; and "Waveplate Polarization Rotator" Ser. No. 09/482,378, filed Jan. 13, 2000; These applications are incorporated herein by reference.

Thus, there is a need in the art for a rotator which is much thinner than an equivalent 90° quartz rotator using much less optical grade material. There is a Other need for a rotator would be made of any uniformly birefringent medium. This would extend the possible wavelength range of operation as optically active rotators are not currently available at all wavelengths.

SUMMARY OF THE INVENTION

The need in the art is addressed by the optical rotator of the present invention. The inventive optical rotator includes a pair of waveplates which receive a polarized beam having a first state and outputs a polarized beam having a second state rotated 90° with respect to the first state. In the illustrative embodiment, the rotator includes first and second waveplates formed as a monolithic element. In another illustrative embodiment, the waveplates are coupled to one another by an optical spacer.

A rotator constructed in accordance with the present teachings should be much thinner than the equivalent 90° quartz rotator and, thus, use much less optical grade material. Moreover, the inventive rotator is compact and can be made of any uniformly birefringent medium. The uniformly birefringent material extends the possible wavelength range of operation. In addition, in accordance with the present teachings, rotators of larger size are possible because of the reduced amount of material required for a given diameter rotator.

A rotator constructed in accordance with the present teachings may be used for laser applications that require a strongly pumped laser rod that exhibits more than a quarter-wave of thermal birefringence.

BRIEF DESCRIPTION OF THE DRAWINGS

FIG. 1 is a diagram illustrative of an optical rotator constructed in accordance with the teachings of the present invention.

FIG. 2 is an illustration of an alternate configuration of the optical rotator according to the present invention.

FIGS. 3A–3C illustrate alternative embodiments of the optical rotator according to the present invention.

FIG. 4 illustrates a thermal birefringence compensated laser rod employing the optical rotator depicted in FIG. 1.

DESCRIPTION OF THE INVENTION

Illustrative embodiments and exemplary applications will now be described with preference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a diagram illustrative of an optical rotator constructed in accordance with the teachings of the present invention. In the illustrative embodiment, the Reeder Rotator 10 is designed to rotate any input polarization state by 90°. Hence, the inventive rotator (hereinafter 'Reeder Rotator') is the waveplate equivalent of a 90° optically active rotator (such as quartz). As illustrated in FIG. 1, the Rotator 10 is formed from two half waveplates 20 and 30 oriented 45° apart. It should be noted that the optical rotator according to the present invention can be formed from a single, monolithic structure without departing from the scope of the present teachings. Alternatively, the Reeder Rotator 10 can be formed from two half waveplates 20, 30 oriented 45° apart and separated by an optically passive material, i.e., an optical spacer 40, where optical power through the Reeder Rotator 10 is a consideration, from a cooling standpoint. See FIG. 2. Implementation of a rotator with two half waveplates is a particularly novel aspect of the present invention.

Before discussing the preferred embodiments of the present invention in further detail, some background discussion on polarization "tracing" with Jones matrices will first be given to aid in the understanding of the invention. Jones matrices are 2×2 matrix operators that are used to trace polarization states, where an electric field is written as a two-element column vector. The field state after the optic described by the Jones matrix J is $$\vec{E}' = \vec{J} \quad [1]$$

or $$\begin{pmatrix} E'_x \\ E'_y \end{pmatrix} = J \begin{pmatrix} E_x \\ E_y \end{pmatrix}. \quad [2]$$

Jones matrices are very simple in the coordinate system of the optic described herein, but these principle axes are not always lined up with the lab reference frame, i.e., horizontal (x) and vertical (y). Rotation matrices allow for conversion between these different frames of reference. Thus, a general Jones matrix is of the form $$J = R_- J_{principle} R_+, \qquad [3]$$

with rotations to and from the optic's principle axes. A rotation matrix is $$R = \begin{pmatrix} \cos\theta & \sin\theta \\ -\sin\theta & \cos\theta \end{pmatrix}, \qquad [4]$$

where the previous plus and minus subscripts referred to whether the rotation angle was $+\theta$ or $-\theta$. A waveplate with a phase difference of $\phi$ at an angle of $\theta$ has a Jones matrix of $$W = \begin{pmatrix} \cos\theta & -\sin\theta \\ \sin\theta & \cos\theta \end{pmatrix} \begin{pmatrix} e^{i\frac{\varphi}{2}} & 0 \\ 0 & e^{i\frac{\varphi}{2}} \end{pmatrix} \begin{pmatrix} \cos\theta & \sin\theta \\ -\sin\theta & \cos\theta \end{pmatrix} \qquad [5]$$

where absolute phase is not of concern. Note that it is implied that $R=R(\theta)$ and $W=W(\phi,\theta)$.

The Jones matrix for a 90° optically active rotator is $$Rot_{90°} = R(-90°) = \begin{pmatrix} 0 & -1 \\ 1 & 0 \end{pmatrix}. \qquad [6]$$

which swaps the field components and puts a 180° phase shift on one of them, i.e., $$Rot_{90°} \begin{pmatrix} E_x \\ E_y \end{pmatrix} = \begin{pmatrix} 0 & -1 \\ 1 & 0 \end{pmatrix} \begin{pmatrix} E_x \\ E_y \end{pmatrix} = \begin{pmatrix} -E_y \\ E_x \end{pmatrix} \qquad [7]$$

The sign difference between a rotator and a rotation matrix is due to the fact that a rotator rotates a field while a rotation matrix rotates the coordinate system.

The Reeder Rotator of the present invention is the waveplate equivalent to the optical rotator discussed immediately above. As mentioned above, the inventive rotator consists of two waveplates at an angle of 45° with respect to each other. The Jones matrix for this configuration is:

$$W_{\lambda/2}(0°)W_{\lambda/2}(45°) = \begin{pmatrix} i & 0 \\ 0 & -i \end{pmatrix} \left[ \frac{1}{2} \begin{pmatrix} 1 & -1 \\ 1 & 1 \end{pmatrix} \begin{pmatrix} i & 0 \\ 0 & -i \end{pmatrix} \begin{pmatrix} 1 & 1 \\ 1 & 1 \end{pmatrix} \right] \qquad [8]$$

$$= \begin{pmatrix} 0 & -1 \\ 1 & 0 \end{pmatrix} = Rot_{90°},$$

where the half waveplate at 45° swaps the components and the one 0° puts on the 180° phase difference. Of course, this interpretation depends on absolute orientation, even though the behavior of the Reeder Rotator does not. The only requirement is that the two half waveplates be 45° apart in angle (or −45°, or ±135°, some angles giving a −90° rotation). Since this waveplate rotator rotates every linear input state by 90°, it must work that way independent of absolute orientation, i.e., $$W_{\lambda/2}(\theta)W_{\lambda/2}(45°+\theta) = Rot_{90°} \text{ for all } \theta. \qquad [9]$$

It should be mentioned that the Reeder Rotator can be used anywhere that an optically active 90° rotator is used. One of the advantages of the Reeder Rotator is that it is much thinner than an equivalent optically active rotator, using much less material and taking up much less space. Thus, the Reeder Rotator can be made out of any uniform birefringent medium, which extends the possible wavelength range of operation.

In addition, it is often possible to separate two parallel beams with the same linear polarization state but with different wavelengths by making the waveplates employed in the Reeder Rotator multi-order, e.g., a net half waveplate for the first wavelength and a net full wave for the second. Thus, the first wavelength is rotated 90°, while the second is not rotated at all. It should be noted that the same could be done with a single waveplate if the polarization state of the beam is known and fixed.

FIG. 2 is an illustration of an alternate configuration of the optical rotator according to the present invention. As shown in FIG. 2, the Reeder Rotator 10' is formed from two half waveplates 20, 30 oriented 45° apart and separated from one another by an optical spacer 40, e.g., a section of white YAG. It should be noted that the Reeder Rotator 10' is preferable to the Reeder Rotator 10 when optical power through the rotator is a consideration, from a cooling standpoint. It should also be noted that both Reeder Rotator 10' and Reeder Rotator 10 rotate any input polarization state by 90°. It will be appreciated that other variations and alternative configurations are possible, as shown in FIGS. 3A–3C (see the teachings of which are incorporated herein by reference), which collectively illustrate a waveplate rotator that consists of either three waveplates or several groups of three waveplates. In an exemplary case, the outer two waveplates, which are generally denoted 20n and 30n, are quarter waveplates, while the inner waveplate, generally denoted 50n, has a phase difference that equals twice the desired rotation angle, i.e., 90°. Although an infinite number of variations are possible, it will also be appreciated that most of these variations require too many elements to make these variations practical.

One application of the Reeder Rotator is thermal birefringence compensation, which is shown here as for the exemplary thermal birefringence compensated laser rod 100 illustrated in FIG. 4 (see application Ser. No. 09/482,230 the teachings of which are incorporated herein by reference).

FIG. 4 illustrates a thermal birefringence compensated laser rod employing the optical rotator depicted in FIG. 1. The laser rod 100 depicted in FIG. 4 makes use of the Scott-Dewit compensation scheme for correcting the thermal birefringence. However, instead of using a thick 90° quartz rotator, which is typically about 1.5 cm long, it uses a Reeder Rotator 10 made of sapphire, which, in the illustrative embodiment, is approximately 132 μm long, disposed between two sections of optical gain material 110. The monolithic rod structure 100 can be made via diffusion bonding or any other suitable technique.

High transmission may be observed when the Reeder Rotator 10 is placed between crossed polarizers, independent of rotator orientation. Moreover, low transmission may be observed when the Reeder Rotator 10 is placed between parallel polarizers, independent of rotator orientation. This should indicate that the Reeder Rotator 10 works according to the mathematical analysis presented above. Although the Reeder Rotator 10 employed in the laser rod illustrated in FIG. 4 can be fabricated from optical quality sapphire material, the present invention is not so limited.

Advantageously, the Reeder Rotator 10 is much thinner than the equivalent 90° quartz rotator and, thus, uses much less optical grade material. Moreover, the Reeder Rotator 10 can be used anywhere that smaller size is desired. Furthermore, the inventive Rotator can be made of any uniformly birefringent medium, which extends the possible wavelength range of operation, since good optically active rotators are not available at all wavelengths. In addition, Reeder Rotator 10 of a larger size are possible because of the reduced amount of material required for a given diameter rotator.

It should be noted that the Reeder Rotator 10 according to the present invention advantageously can be used for laser applications that require a strongly pumped laser rod that exhibits more than a quarter wave of thermal birefringence.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An optical rotator comprising:
   at least first and second half waveplates optically coupled to one another and oriented with respect to one another by a predetermined angle;
   wherein said first waveplate receives a polarized beam having a first state; and
   wherein second waveplate produces the polarized beam having a second state, said first and second states differing from one another by 90°.

2. The optical rotator of claim 1 wherein said first and said second waveplates are physically coupled to one another.

3. The optical rotator of claim 1 wherein said first and said second waveplates are formed in a monolithic element.

4. The optical rotator of claim 1 wherein said first and said second waveplates are physically coupled to one another by an optical spacer.

5. An optical rotator comprising:
   a first waveplate receiving a polarized beam having a first state and generating the polarized beam having a second state; and
   a second waveplate oriented 45° from said first waveplate, which receives the polarized beam at said second state and produces the polarized beam having a third state;
   wherein said first and third states differ from one another by 90°.

6. The optical rotator of claim 5 wherein said first and said second waveplates are physically coupled to one another.

7. The optical rotator of claim 5 wherein said first and said second waveplates form a monolithic element.

8. The optical rotator of claim 5 wherein said first and said second waveplates are physically coupled to one another by an optical spacer.

9. The optical rotator of claim 5 wherein said first and said second waveplates are disposed substantially parallel to one another.

10. The optical rotator of claim 5 wherein said first and said second waveplates are disposed substantially parallel to one another along a common optical axis.

11. An optical rotator comprising:
    a first half waveplate mounted to receive a polarized beam having a first state and adapted to generate a polarized beam having a second state; and
    a second half waveplate oriented 45° from said first waveplate, mounted to receive the polarized beam at said second state and adapted to produce a polarized beam having a third state;
    wherein said first and third states differ from one another by 90°.

* * * * *

(12) EX PARTE REEXAMINATION CERTIFICATE (5057th)
United States Patent
Reeder

(10) Number: US 6,268,962 C1
(45) Certificate Issued: Feb. 8, 2005

(54) REEDER ROTATOR

(75) Inventor: Robin A. Reeder, El Segundo, CA (US)

(73) Assignee: Raytheon Company, El Segundo, CA (US)

Reexamination Request:
No. 90/006,257, Mar. 27, 2002

Reexamination Certificate for:
Patent No.: 6,268,962
Issued: Jul. 31, 2001
Appl. No.: 09/483,254
Filed: Jan. 13, 2000

(51) Int. Cl.⁷ .................................................. G02B 5/30
(52) U.S. Cl. ................................. 359/497; 359/494
(58) Field of Search ............................ 349/73, 99, 100; 359/494, 495, 497, 498

(56) References Cited

U.S. PATENT DOCUMENTS

| 3,060,808 A | | 10/1962 | Koester |
| 3,578,848 A | * | 5/1971 | Austin |
| 3,919,452 A | * | 11/1975 | Ettre et al. |
| 4,678,287 A | * | 7/1987 | Buhrer ................. 359/498 |
| 4,772,104 A | * | 9/1988 | Buhrer ................. 359/498 |
| 4,806,750 A | * | 2/1989 | Vincent |
| 4,961,634 A | | 10/1990 | Chipman |
| 5,054,888 A | * | 10/1991 | Jacobs et al. |
| 5,231,521 A | * | 7/1993 | Johnson et al. |

FOREIGN PATENT DOCUMENTS

| FR | 2.048.153 A | 3/1971 |
| FR | 2.211.667 A | 7/1974 |
| GB | 2 105 864 A | 3/1983 |

OTHER PUBLICATIONS

Hecht, "Optics", pp. 305–306, 1987.*
Fowles, G., "Introduction to Modern Optics", 1968, Holt, Rinehart and Winston, Inc., pp. 43 to 46.*

* cited by examiner

*Primary Examiner*—Ricky D. Shafer

(57) ABSTRACT

An optical rotator includes a pair of waveplates which receive a polarized beam having a first state and outputs a polarized beam having a second state rotated 90° with respect to the first state. In the illustrative embodiment, the first and second waveplates are physically coupled to one another.

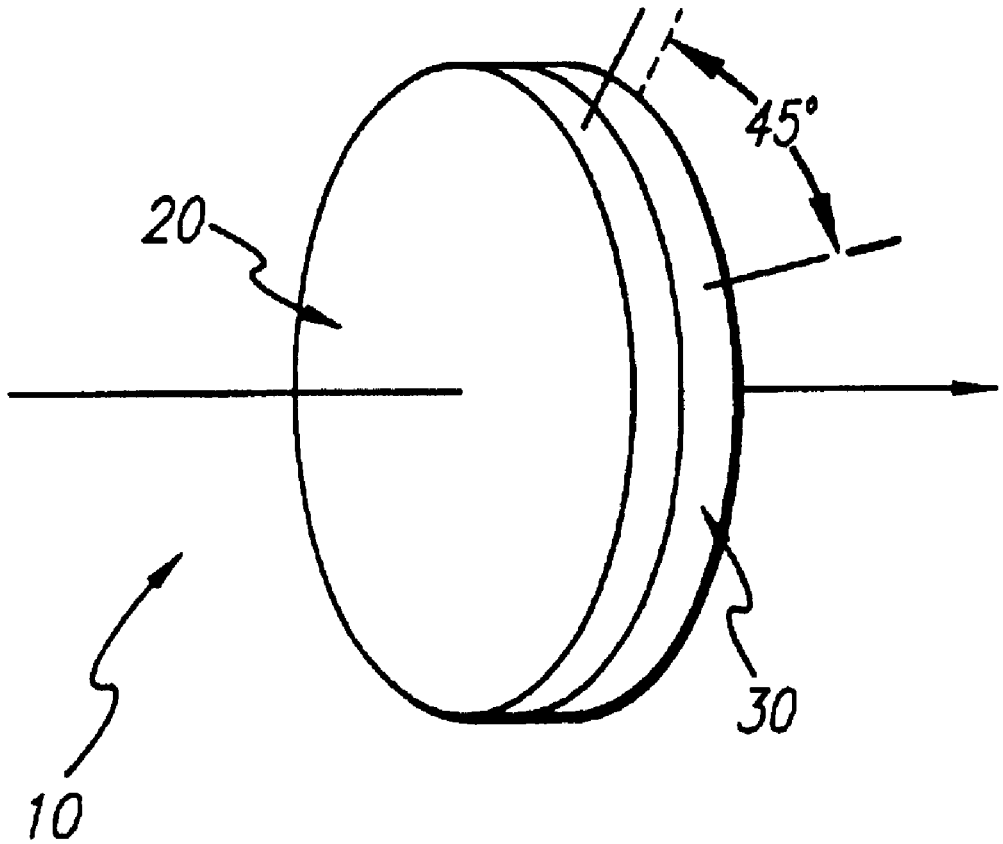

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–11 are cancelled.

\* \* \* \* \*